United States Patent [19]
Asano et al.

[11] Patent Number: 5,457,787
[45] Date of Patent: Oct. 10, 1995

[54] INTERFACE CIRCUIT FOR CONTROLLING DATA TRANSFERS

[75] Inventors: Hideo Asano, Machida; Masayuki Murakami, Fujisawa, both of Japan

[73] Assignee: International Business Machines Corporation, Armonk, N.Y.

[21] Appl. No.: 130,951

[22] Filed: Oct. 4, 1993

[30]  Foreign Application Priority Data

Oct. 2, 1992 [JP] Japan .................................. 4-264371

[51] Int. Cl.$^6$ .................................................. G06F 13/14
[52] U.S. Cl. .................................. 395/375; 364/DIG. 1;
364/DIG. 2; 364/236.2; 364/241.2; 364/248.1;
364/260; 364/941; 364/941.1
[58] Field of Search ......................... 395/275, 500,
395/200, 700, 800, 375; 364/DIG. 1 MS File,
DIG. 2 MS File

[56] References Cited

U.S. PATENT DOCUMENTS

| | | | |
|---|---|---|---|
| 4,509,113 | 4/1985 | Heath | 395/275 |
| 4,607,328 | 8/1986 | Furukawa et al. | 395/250 |
| 4,947,366 | 8/1990 | Johnson | 395/275 |
| 5,014,237 | 5/1991 | Masters et al. | 395/500 |

*Primary Examiner*—Robert B. Harrell
*Attorney, Agent, or Firm*—Owen J. Gamon

[57]  ABSTRACT

An interface circuit for a peripheral device is disclosed that can accurately cope with any host with the same hardware whether the host is in the pre-read mode or the post-read mode and can send an interrupt request to the host practically without a waiting time if the host is in the post-read mode. The interface circuit generates an interrupt request (IRQ) to a host in response to a data request (DRQ) from a peripheral device (HDD) and drops the interrupt request if the status of the peripheral device is read by the host; it detects that the host operates in a post-read mode, and responds to the post-read mode detect signal and the status reading by the host in order to enable the regeneration of the interrupt request to the host.

24 Claims, 5 Drawing Sheets

INTERFACE CIRCUIT FOR CONTROLLING DATA TRANSFERS

FIELD OF THE INVENTION

The invention relates to an interface circuit for controlling data transfers, and more particularly to an interface circuit for performing data transfers between a peripheral device such as a hard disk drive (HDD) and a host by an interrupt from the peripheral device to the host.

BACKGROUND OF THE INVENTION

In personal computer systems, the AT interface is widely used to connect a host with its peripheral devices. A HDD is a typical peripheral device. From a viewpoint of peripheral manufacturers, it is desired that communications with a host through the AT interface be standardized, but some commands allow more than one operation sequence. For example, a Read command for an HDD is executed in either one of two operation sequences depending on when a status register of the HDD is read by the host. The first operation sequence is as follows:

1. When data (usually in one sector) becomes ready to be transferred to the host, the HDD sets a data request (DRQ) bit of the status register high and at the same time asserts an interrupt request IRQ to the host.

2. Receiving the IRQ from the HDD, the host first reads the status register of the HDD (The IRQ is reset or dropped at that time. The IRQ is always reset whenever the status register is read by the host), and then starts a data transfer.

3. When the transfer of a sector of data is completed, the HDD once resets the DRQ bit.

4. Steps 1 to 3 are repeated for the requested number of sectors.

In the above sequence, the host reads the status register before the data transfer is started, and therefore, the sequence is hereinafter referred to as "pre-read". However, some hosts handle the Read command as follows:

1. Same as Step 1 of the pre-read.

2. Receiving the IRQ from the HDD, the host first starts a data transfer which continues till the end of that sector.

3. Same as Step 3 of the pre-read.

4. The host reads the status register of the HDD (the IRQ is reset thereby).

5. Steps 1 to 4 are repeated for the requested number of sectors.

In the second sequence, the host reads the status register after the transfer of a sector of data is completed, and therefore, this sequence is hereinafter referred to as "post-read". If the host operates in a post-read mode, a malfunction would occur in the case where the host attempts to read the status register of the HDD to obtain the current sector status (Step 4 of the post-read) after the next sector of data becomes ready to be transferred in the HDD (Step 1 following Step 4). In this case, an IRQ for the next sector is reset by the status register reading for the previous sector transfer, which results in an abnormal situation where the host continues to wait for the IRQ for the next sector while the HDD continues to wait for the data transfer. In fact, such abnormal situation has occurred, since the IRQ for the next sector is asserted by hardware as soon as the sector data becomes available.

To avoid the abnormal situation described above, it is necessary to assert the IRQ for the next sector after the host reads the status register. However, since the above abnormal situation will not occur when the host is in the pre-read mode, a scheme to merely delay the IRQ would cause a problem that the performance of data transfer is lowered when the host is in the pre-read mode. Therefore, the prior art has adopted a method in which a switch is set according to whether the host is in the pre-read mode or the post-read mode and, in case of the post-read, the IRQ is asserted again immediately after the status register is read instead of delaying the IRQ. Thus, the performance is not lowered even in case of the post-read. However, in modern hosts, there are many cases where either one of the pre-read and post-read modes is used depending on an operating system (OS) (for example, the pre-read and post-read modes are used under OS/2 and conventional DOS, respectively) and therefore the switch must be set each time of mode change.

Another method uses a microcode to entirely control the IRQ. According to the method, since the IRQ is always asserted late, both the pre-read and post-read modes function normally while the performance is not good as compared with the hardware control.

To solve the problems as described above, Japanese Patent Application No. 3-337995, which is a prior application of the present assignee, discloses an interface circuit that automatically detects whether the host is in the pre-read mode or the post-read mode. The interface circuit includes a mode detecting circuit for automatically detecting a mode of the host according to the states of a data request signal DRQ from a controller of the HDD and an interrupt request signal IRQ to be transmitted to the host, a delay circuit for delaying the DRQ by a predetermined amount of time when the host is in the post-read mode, and an interrupt request generating circuit for generating an IRQ to the host in response to an output (controlled DRQ) from the delay circuit. When the mode detecting circuit detects that the host is in the pre-read mode, the delay circuit does not operate and the DRQ is provided, without delay, to the interrupt request generating circuit as a controlled DRQ.

When the above interface circuit is used, performance is improved as compared with the conventional methods for changing by the switch and for controlling by the microcode, but there is a problem that an IRQ cannot be immediately generated even if the host has completed the status reading before the predetermined delay time elapses since the delay time of the DRQ is previously fixed.

SUMMARY OF THE INVENTION

It is an object of the present invention to provide an interface circuit which can accurately cope with both pre-read and post-read with the same hardware, and also can generate the next interrupt request immediately after the status reading is performed if the host is in the post-read mode.

The invention relates to an interface circuit which accurately performs data transfers irrespective of the mode of a host in a computer system in which data is transferred, based on an interrupt, between a peripheral device and the host. In such a computer system, a peripheral device generates a data request and sends an interrupt request to the host when a block of data is ready to be transferred. The host responds to the interrupt request and operates either in a first mode to start a block data transfer after reading status of the peripheral device or in a second mode to read the status of the peripheral device after completing the block data transfer.

The interface circuit of the present invention comprises interrupt means for generating the interrupt request to the host in response to the data request from the peripheral device and dropping the interrupt request if the status is read by the host, mode detecting means for detecting that the host is in the second mode if the status of the peripheral device is not yet read even if the next data request is generated, and means responsive to the second mode detect signal from the mode detecting means and the status reading by the host to enable said interrupt means to regenerate the interrupt request to the host.

DETAILED DESCRIPTION OF THE PREFERRED EMBODIMENT

Figure 1:
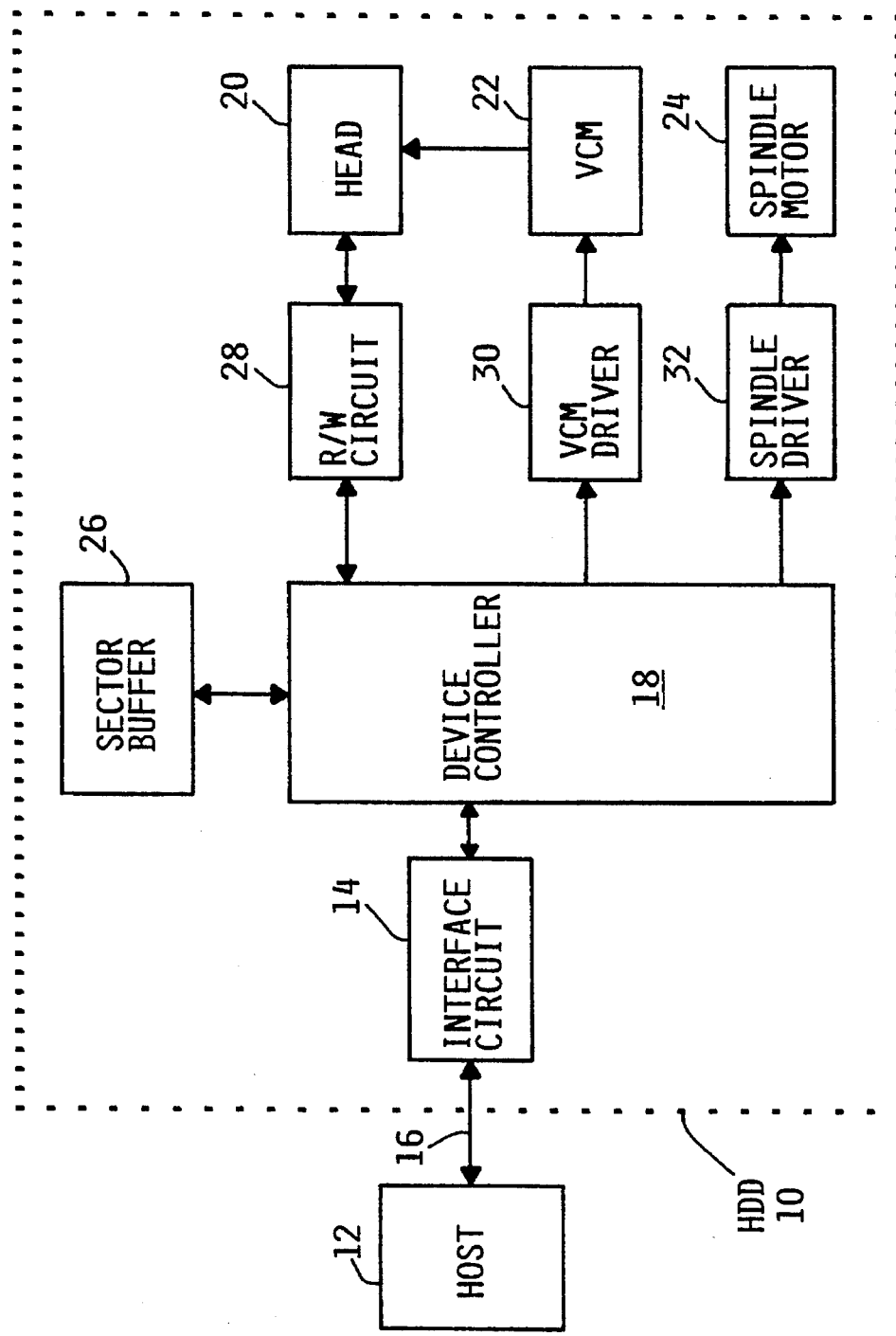
FIG. 1 is a block diagram showing an example of the configuration of a computer system including an interface circuit according to the present invention.

An overall system configuration including the interface circuit of the present invention is shown in FIG. 1. Although a peripheral device is assumed to be an HDD in this embodiment, the present invention can be applied to any peripheral device having the above-mentioned problems with respect to the pre-read and post-read.

In FIG. 1, HDD 10 enclosed by broken lines is connected to host 12 through interface circuit 14 and system bus (AT bus) 16. Host 12 includes a microprocessor such as i80386 or the like and forms a Personal Computer AT system of the present assignee or its compatible system together with the HDD 10 and other peripheral devices (keyboard, display, etc.) not shown.

HDD 10 includes a microprocessor-controlled device controller 18 that controls the entire HDD. Device controller 18 has three main functions: control of reading and writing by head 20, control of Voice Coil Motor (VCM) 22 for moving head 20, and control of spindle motor 24 for rotating a disk (not shown). Sector buffer 26 and read/write (R/W) circuit 28 are used to read or write by the head. In the preferred embodiment, sector buffer 26 can store 64 sectors of data (32 Kbytes). R/W circuit 28 has a well-known configuration including various circuits necessary for reading and writing, that is, an amplifier, a peak detecting circuit, a variable frequency oscillator (VFO), an encoder, a decoder, a servo logic, an analog-to-digital converter, a digital-to-analog converter, etc. VCM 22 and spindle motor 24 are controlled through VCM driver 30 and spindle driver 32, respectively. Since, except for interface circuit 14, each of the system components shown in FIG. 1 may be a conventional one having a well-known configuration, details thereof are not described herein.

Figure 2:
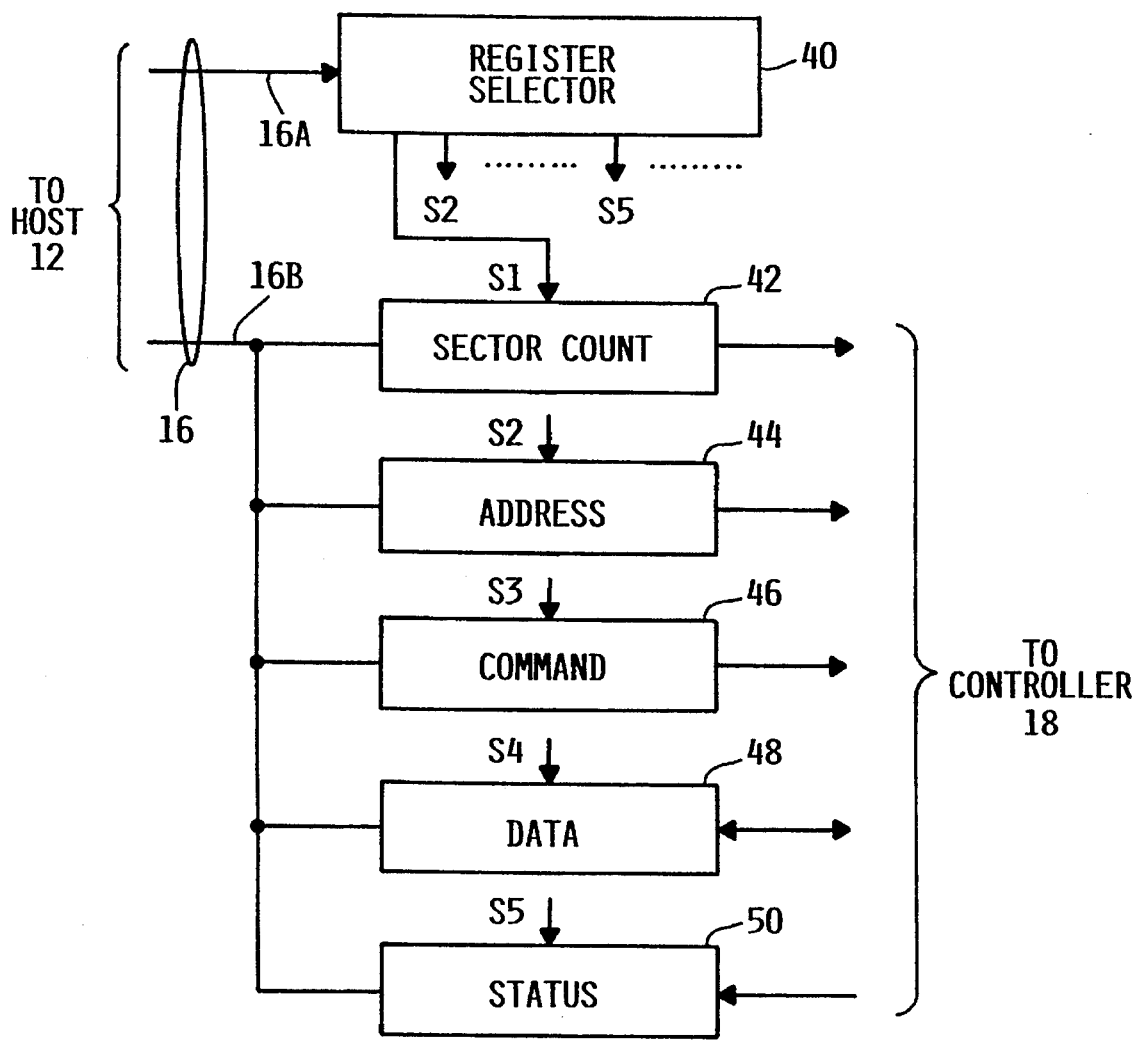
FIG. 2 is a block diagram showing the configuration of an input/output section for a host in the interface circuit.

FIG. 2 shows a configuration of an input/output section of interface circuit 14. The input/output section includes plural registers selected by register selector 40, that is, sector count register 42, address register 44, command register 46, data register 48, and status register 50. Although address register 44 actually consists of four registers (two cylinder address registers, one sector address register, and one drive/head address register), these registers are treated, for convenience, as a single register in the following explanation.

Sector count register 42 retains the number of sectors to be read or written, address register 44 retains a start address thereof, command register 46 retains a command code, data register 48 retains data to be written to HDD 10 from host 12 or data to be read out to host 12 from HDD 10, and status register 50 contains a plurality of bits indicating status of the HDD (for details, refer to the AT Attachment, which is a proposed Standard for the AT interface). These registers are selected by the information provided to register selector 40 from host 12 through system bus 16. At that time, register selector 40 generates a signal Si (i=1,2,3, . . . ) for selecting a specified register. Although FIG. 2 shows only the five registers that are necessary for the understanding of the present invention, more than five registers are actually provided.

When host 12 sends a command to interface circuit 14, it places an address for selecting a particular register and an input/output write (-IOW) signal on bus 16A and information to be written to the selected register on bus 16B. Buses 16A and 16B are included in system bus 16. Taking a Read command as an example, host 12 first transmits signals for indicating a write to sector count register 42, that is, an address of sector count register 42 and an input/output write signal over bus 16A and a sector count over the bus 16B. Register selector 40 generates a signal S1 for selecting sector count register 42 in response to the signal on bus 16A to load the sector count on bus 16B into register 42. Then host 12 transmits signals for indicating a write to the address register 44 and a start address over buses 16A and 16B, respectively. Register selector 40 thereby generates a signal S2 selecting address register 44 to load the start address on bus 16B into register 44. Finally host 12 transmits signals for indicating a write to command register 46 and a Read command code over buses 16A and 16B, respectively, and the Read command code is thus loaded into command register 46.

Upon completion of loading into the registers 42, 44, and 46, controller 18 then performs a read operation specified by the contents thereof and writes data read from the disk (not shown) to sector buffer 26. For a Write command, data to be written to the disk is additionally transmitted from bus 16B to data register 48. In the write operation, the above-mentioned problem of the pre-read and post-read does not occur, and therefore it is not described here.

Data transfers from HDD 10 to host 12 during the read operation are performed on an interrupt basis. As described above, HDD 10 transmits a data request signal DRQ to interface circuit 14 when a predetermined number of sectors of data (for example, one sector of data) is written to sector buffer 26 from the disk and thus data is ready to be transferred to the host. Interface circuit 14 responds to the DRQ and sends an interrupt to host 12 to start data transfer from sector buffer 26 to host 12. An interrupt control section of the interface circuit is shown in FIG. 3, which efficiently performs the data transfer based on the interrupt whether host 12 is in the pre-read or post-read mode.

Figure 3:
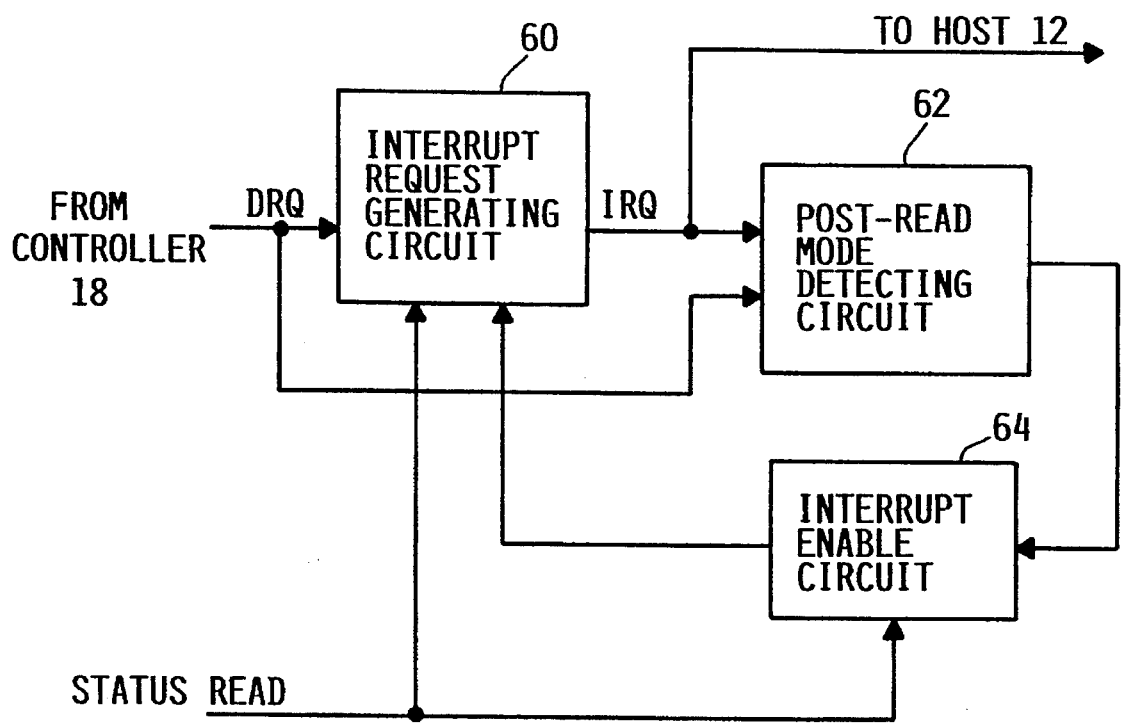
FIG. 3 is a block diagram showing the configuration of an interrupt control section in the interface circuit.

The interrupt control section of FIG. 3 includes interrupt request generating circuit 60 for generating an interrupt request IRQ to host 12 in response to a DRQ from controller 18. Circuit 60 drops the IRQ when the status is read by host 12. The DRQ and IRQ are also provided to post-read mode detecting circuit 62. Post-read mode detecting circuit 62 generates a post-read signal indicating that host 12 is in the post-read mode if the status is not yet read by host 12, that is, if the previous IRQ still remains generated when the next DRQ is generated. The post-read signal is provided to interrupt enable circuit 64. Interrupt enable circuit 64 enables interrupt request generating circuit 60 to generate a new IRQ in response to the post-read signal and the status reading by host 12.

Figure 4:
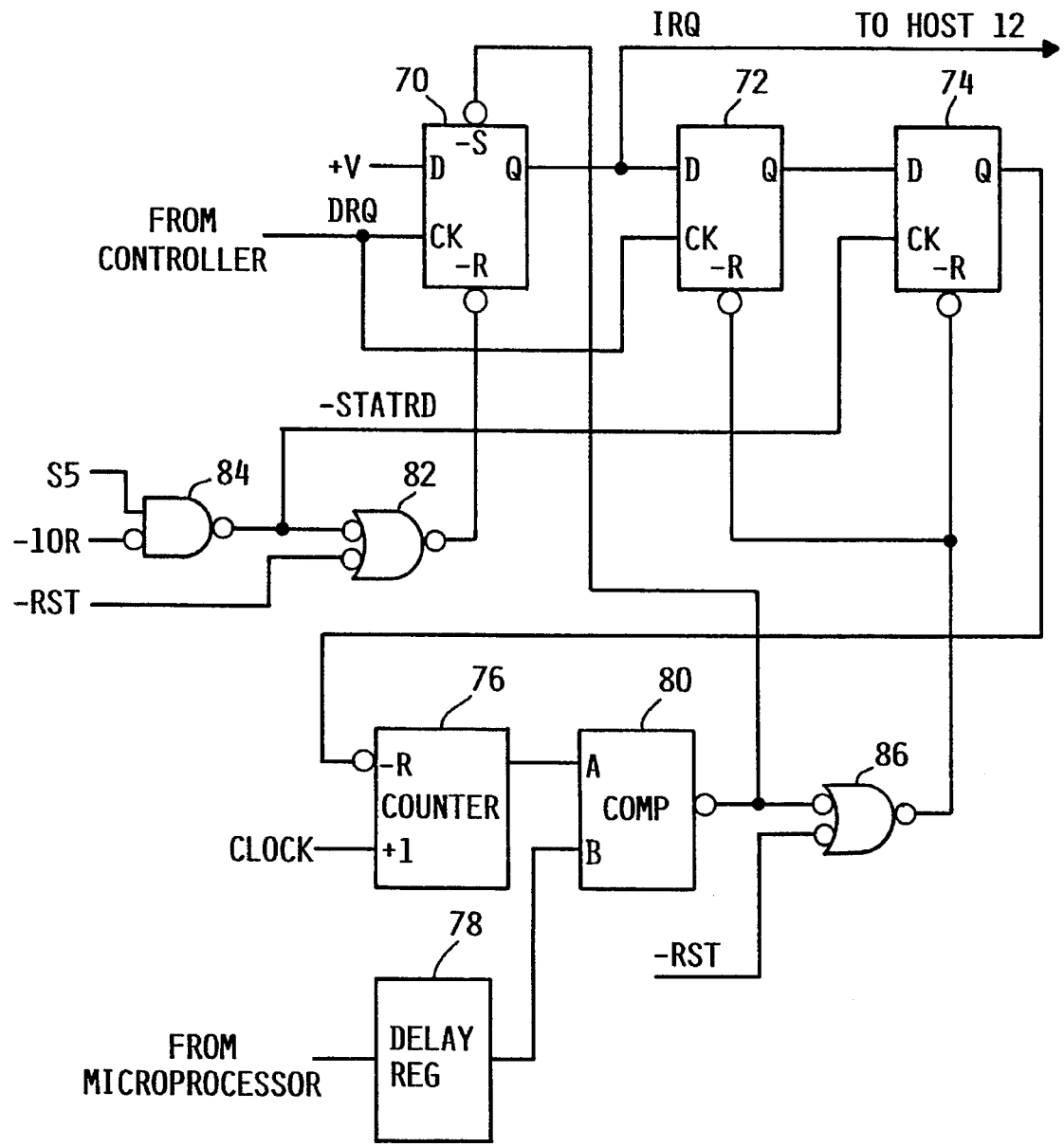
FIG. 4 is a detailed circuit diagram of the interrupt control section shown in FIG. 3.

FIG. 4 shows a detailed circuit diagram of the interrupt control section. The interrupt control section includes first flip-flop 70 operating as interrupt request generating circuit 60 and second flip-flop 72 operating as post-read mode detecting circuit 62. Third flip-flop 74, counter 76, delay value register 78, and comparator 80 compose interrupt enable circuit 64 in FIG. 3. A data terminal D of first flip-flop 70 is always kept high and its clock terminal CK receives a data request signal DRQ from controller 18. A negative set terminal –S is connected to an output of comparator 80 and a negative reset terminal –R is connected to an output of NOR gate 82. Both of two inputs of NOR gate 82 are inverted ones and receive the output of NAND gate 84 and a negative reset signal –RST generated at the time of initial reset such as power-on, respectively. One input of NAND gate 84 receives a signal S5 from register selector 40 in FIG. 2 and the other input receives an input/output read signal –IOR from host 12. A Q output of first flip-flop 70 is connected not only to a data terminal D of second flip-flop 72, but also to a bus line to host 12 through a bus driver (not shown).

A clock terminal CK of second flip-flop 72 also receives the DRQ. A Q output of second flip-flop 72 is connected to a data terminal D of third flip-flop 74 and its negative reset terminal –R is connected to an output of NOR gate 86. NOR gate 86 receives the above reset signal –RST and the output of comparator 80.

A clock terminal CK of third flip-flop 74 whose data terminal D is connected to the Q output of second flip-flop 72 is connected to an output of NAND gate 84, its negative reset terminal –R is connected to the output of NOR gate 86, and its Q output is connected to a negative reset terminal –R of counter 76. Counter 76 is released from the reset state by a negative input to the negative reset terminal –R so that it starts counting in response to a clock. A count value of counter 76 is provided to a first input A of comparator 80. Provided to a second input B of comparator 80 is a delay value retained in delay value register 78. A predetermined delay value is loaded into delay value register 78 from a microprocessor (not shown) of the controller 18 at each power-on time. An inverted output of comparator 80 is connected to the negative set terminal –S of first flip-flop 70 and one of inverted inputs of NOR gate 86.

It is assumed that each of flip-flops 70, 72, and 74 in the embodiment of FIG. 4 is set to the state of it data terminal D in response to a positive transition at its clock terminal CK and is reset when its reset terminal –R becomes low. Flip-flop 70 is set when the set terminal S becomes low. However, as far as the present invention is concerned, each flip-flop may be a negative transition response type, and also be a type which is set and reset by a high level signal. Further, with respect to the logic, it is also possible to use the positive logic of AND and OR instead of the negative logic of NAND and NOR.

Figure 5:
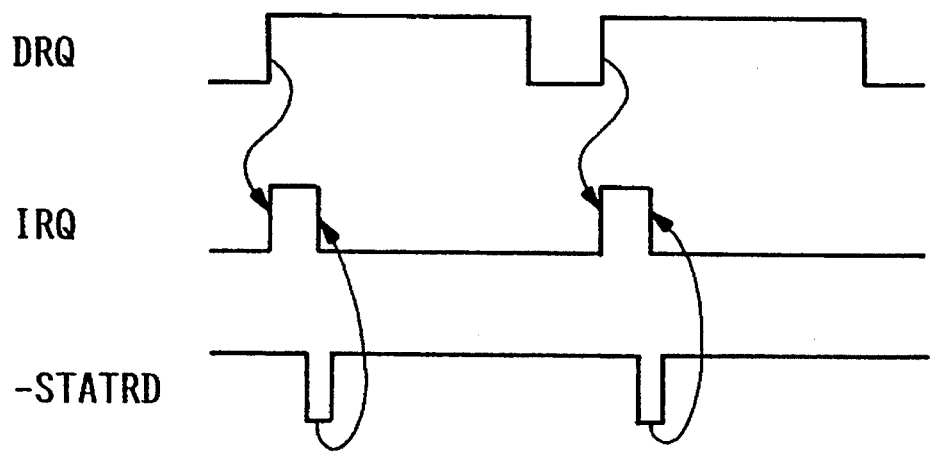
FIG. 5 is a timing chart of operations in a case where the host is in the pre-read mode.
Figure 6:
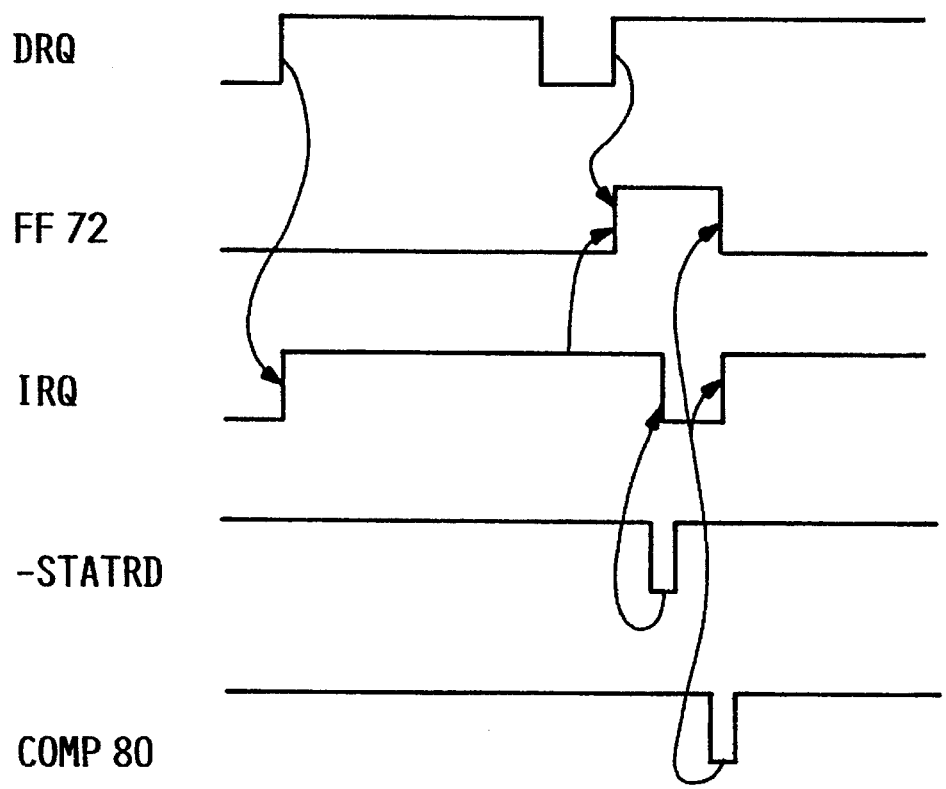
FIG. 6 is a timing chart of operations in a case where the host is in the post-read mode.

Next, the operations of the interface circuit according to the present invention are described in detail with reference to FIG. 5 showing a time chart for the pre-read and FIG. 6 showing a time chart for the post-read.

1. Pre-read

As described above, a Read command includes a sector count, which specifies the number of sectors to be read, a start address, and a command code. When they are received by registers 42, 44, and 46 in FIG. 2, respectively, controller 18 starts to read data from the disk to sector buffer 26. When a sector of data is written to sector buffer 26, controller 18 generates a data request signal DRQ and sends it to the interrupt control section FIG. 3) of interface circuit 14. The DRQ is applied to the clock terminal CK of flip-flops 70 and 72. Since the data terminal D of first flip-flop 70 is always kept high, flip-flop 70 is set by the positive transition of the DRQ so that its Q output or an interrupt request IRQ becomes high to interrupt host 12. Although the DRQ is applied also to the clock terminal CK of second flip-flop 72, flip-flop 72 remains reset since the Q output of first flip-flop 70 does not yet become high when the DRQ is changed from low to high.

The host 12 in the pre-read mode reads status register 50 in interface circuit 14 in response to the interrupt request IRQ from HDD 10 to know the status of HDD 10 before starting data transfer. To this end, host 12 transmits signals indicating read of status register 50, that is, an address of status register 50 and an input/output read signal –IOR over bus 16A. In response to the signals, register selector 40 generates a signal S5 for selecting status register 50 to cause its contents to be gated to bus 16B. Status register 50 contains not only the DRQ bit described above, but also a plurality of status bits representing the status of HDD 10 such as a busy bit indicating that HDD 10 is busy, an error bit indicating that an error has occurred during the command execution, etc.

The status register selecting signal S5 is applied also to a first input of NAND gate Applied to a second input of NAND gate 84 is an input/output read signal –IOR from host 12. This signal indicates reading of various I/O registers (refer to FIG. 2) in interface circuit 14 and is defined, in the AT interface, as active low. NAND gate 84 is conditioned by the active S5 and –IOR to set the output –STATRD indicating the status reading by host 12 to low. This output –STATRD is provided, through NOR gate 82, to the negative reset terminal –R of first flip-flop 70 to reset flip-flop 70. Thus the interrupt request IRQ to host 12 is dropped (refer to a waveform of the IRQ shown in FIG. 5). Although the output –STATRD is applied also to the clock terminal CK of third flip-flop 74, flip-flop 74 remains reset even if the –STATRD is changed from low to high since the data terminal D (Q output of flip-flop 72) is kept low at that time.

To read data written to the sector buffer 26, host 12 transmits signals for reading data register 48 over bus 16A after reading status register 50. If it is assumed that a bit width of data register 48 is 16 bits and one sector is 512 bytes, then host 12 must read data register 48 256 times for each sector. Data register 48 may be either a latch type or a gate type. If data register 48 is a latch type, controller 18 generates a data request signal DRQ after loading the first 16 bit-word from sector buffer 26 into data register 48, and thereafter, sequentially reads a 16 bit-word from sector buffer 26 and loads it into data register 48 each time host 12 reads data register 48. If data register 48 is a gate type, controller 18 generates a DRQ at the time when a sector of data is written into sector buffer 26 and, thereafter, sequentially reads a 16 bit-word from sector buffer 26 and gates it to bus 16B each time host 12 directs a read of data register 48. In either case, controller 18 counts the read signals −IOR's from host 12 and drops the DRQ when the count reaches 256.

Thereafter, when the next sector of data is ready to be transferred, controller 18 sets the DRQ high again and repeats the above operation. In this connection, if the next sector data is read from the disk and written to sector buffer 26 after host 12 reads the first sector data, it would take a longer time to complete the Read command. Therefore, it is preferable that a read from sector buffer 26 to host 12 and a write from the disk to sector buffer 26 are performed in parallel. In this case, data from the disk is written to sector buffer 26 while data read from sector buffer 26 is transferred to host 12, that is, a read operation of sector buffer 26 is not performed. The same is true of the post-read mode described below. When the number of sector data transferred to host 12 reaches the sector count loaded into sector count register 42, the execution of the Read command is completed.

2. Post-read

Operations in the case where host 12 is in the post-read mode are the same as in the pre-read mode until an interrupt request IRQ is generated. In the post-read mode, host 12 starts data transfer from sector buffer 26 to host 12 by first directing a read of data register 48 in response to the interrupt request IRQ. After reading a sector of data, host 12 directs a read of status register 50. In interface circuit 14, likewise the pre-read, a DRQ becomes low when host 12 has read 512 bytes of sector data. However, as shown in FIG. 6, at the time when the DRQ becomes low, status register 50 is not yet read so that flip-flop 70 is not reset and the interrupt request IRQ remains high. In this condition, when the next sector data is ready to be transferred and the DRQ becomes high again, second flip-flop 72 is also set a high Q output since first flip-flop 70 has already been set. This indicates that host 12 is in the post-read mode.

When host 12 reads status register 50 with flip-flop 72 being set, a negative pulse appears at the output (−STATRD) of NAND gate 84, third flip-flop 74 is set and first flip-flop 70 is reset through NOR gate 82 to thereby make the IRQ low. The high Q output of flip-flop 74 releases the reset state of counter 76. So far as flip-flop 74 is reset and the negative reset terminal −R of counter 76 is kept low, counter 76 remains reset. When counter 76 is released from the reset state, it starts counting and increments by one each time a clock pulse is applied. The contents of the counter 76 are provided to comparator 80 to compare with the contents of delay value register 78.

Delay value register 78 retains a predetermined delay value loaded from a microprocessor (not shown) of controller 18 during the power-on operation. The delay value is programmable and previously set so as not to hinder the interrupt response of host 12. Generally, the delay value loaded into register 78 depends on a host to which HDD 10 is connected and, for example, may be set to 1 if the host allows a situation in which an IRQ may become high at any time after the status reading, that is, the host can issue the next command (in this case, a data register read command) immediately after the status register read command. If the delay value is 0, flip-flop 70 cannot be successfully set since the output of comparator 80 is always active (low) as far as counter 76 is reset. In any case, the delay value should be set in consideration of an amount of time required until the host can respond (issue a command) after the IRQ once became low. If so set, the IRQ can be set high immediately after the host is ready to respond so that a wasteful waiting time is eliminated.

When a count value of counter 76 becomes equal to the contents of delay value register 78, the output of comparator 80 becomes low to thereby set flip-flop 70, and to reset flip-flops 72 and 74 through NOR gate 86. When flip-flop 70 is set, the IRQ becomes high again to request an interrupt to host 12. Thus, according to the present invention, even if an IRQ is not yet reset when a DRQ rises in each of second and subsequent sector data transfers, an IRQ for the next sector data transfer can be surely generated without a waiting time. When a specified number of sector data is read by host 12, the execution of a Read command is completed.

Some hosts, which operate in the post-read mode, perform the status reading a plurality of times for one sector data transfer. The circuit of FIG. 4 preferably operates also for such hosts. However, in that case, the delay value set to delay value register 78 should be determined to be equal to, at least, an amount of time from the first status reading to the last status reading plus an amount of time required until a host is ready to respond after the last status reading. The operations of the circuit of FIG. 4 are the same as in the above description with the exception that the generation of equal output from comparator 80 and accordingly the rise of an IRQ and the reset of flip-flop 72 are delayed as compared with those of FIG. 6. Although the first status reading resets flip-flop 70, the second and subsequent status readings have no effect on the circuit of FIG. 4.

Although the preferred embodiments have been described, the present invention is not limited thereto and allows various modifications. For example, in the embodiments, the DRQ and IRQ were controlled based on the 512-byte sector as a unit block. However, it is appreciated that the length of the unit block is not limited to 512 bytes and may be determined arbitrarily within a suitable range. Further, as described above, each flip-flop in the circuit of FIG. 4 may be a negative transition response type, and it is also possible to use positive logic such as AND and OR as basic logic.

What is claimed is:

1. In a computer system in which a peripheral device generates a data request to send an interrupt request to a host when a block of data is ready to be transferred, and the host responds to said interrupt request and operates in one of a first mode to start a block data transfer after reading status of said peripheral device or in a second mode to read said status after completing said block data transfer, an interface circuit for controlling data transfers, comprising:

interrupt means for generating said interrupt request in response to said data request and dropping said interrupt request in response to said status reading;

mode detecting means for detecting that said host operates in said second mode to read said status after completing said block data transfer; and interrupt enable means responsive to a second mode detect signal from said mode detecting means and said status reading to enable said interrupt means to regenerate said interrupt request.

2. The interface circuit of claim 1, wherein said data request is dropped at the completion of reading said block of data and regenerated when the next block of data is ready to be transferred.

3. The interface circuit of claim 2, wherein said interrupt means includes a first flip-flop which is set in response to the generation of said data request and the output of said flip-flop becomes said interrupt request.

4. The interface circuit of claim 3, wherein said mode detecting means includes a second flip-flop which is set to the same condition as said first flip-flop in response to said data request.

5. The interface circuit of claim 4, wherein said interrupt enable means includes a third flip-flop which is set to the same condition as said second flip-flop in response to said status reading, a counter which starts counting in response to the setting of said third flip-flop, a register into which a predetermined delay value is loaded, and a comparator which compares the contents of said counter and said register and, when they are equal to each other, sets said first flip-flop and resets said second flip-flop and said third flip-flop.

6. The interface circuit of claim 5, wherein said delay value is set so that said interrupt request can be generated when said host is ready to respond.

7. A computer system, comprising:

a host;

a peripheral device connected to said host; and an interface circuit in said peripheral device for controlling data transfers, said interface circuit generates a data request to send an interrupt request to said host when a block of data is ready to be transferred, and said host responds to said interrupt request and operates in one of a first mode to start a block data transfer after reading status of said peripheral device or in a second mode to read said status after completing said block data transfer;

interrupt means for generating said interrupt request in response to said data request and dropping said interrupt request in response to said status reading;

mode detecting means for detecting that said host operates in said second mode; and interrupt enable means responsive to a second mode detect signal from said mode detecting means and said status reading to enable said interrupt means to regenerate said interrupt request.

8. The computer system of claim 7, wherein said data request is dropped at the completion of reading said block of data and regenerated when the next block of data is ready to be transferred.

9. The computer system of claim 8, wherein said interrupt means includes a first flip-flop which is set in response to the generation of said data request and the output of said flip-flop becomes said interrupt request.

10. The computer system of claim 9, wherein said mode detecting means includes a second flip-flop which is set to the same condition as said first flip-flop in response to said data request.

11. The computer system of claim 10, wherein said interrupt enable means includes a third flip-flop which is set to the same condition as said second flip-flop in response to said status reading, a counter which starts counting in response to the setting of said third flip-flop, a register into which a predetermined delay value is loaded, and a comparator which compares the contents of said counter and said register and, when they are equal to each other, sets said first flip-flop and resets said second flip-flop and said third flip-flop.

12. The computer system of claim 11, wherein said delay value is set so that said interrupt request can be generated when said host is ready to respond.

13. A method in a computer system for a peripheral device to generate a data request to send an interrupt request to a host when a block of data is ready to be transferred, and the host to respond to said interrupt request and operate in one of a first mode to start a block data transfer after reading status of said peripheral device or in a second mode to read said status after completing said block data transfer, comprising the steps of:

generating said interrupt request in response to said data request and dropping said interrupt request in response to said status reading;

detecting that said host operates in said second mode to read said status after completing said block data transfer; and responding to a second mode detect signal from said detecting step and said status reading to enable said generating step to regenerate said interrupt request.

14. The method of claim 13, wherein said data request is dropped at the completion of reading said block of data and regenerated when the next block of data is ready to be transferred.

15. The method of claim 14, wherein said generating step uses a first flip-flop which is set in response to the generation of said data request and the output of said flip-flop becomes said interrupt request.

16. The method of claim 15, wherein said detecting step uses a second flip-flop which is set to the same condition as said first flip-flop in response to said data request.

17. The method of claim 16, wherein said detecting step uses a third flip-flop which is set to the same condition as said second flip-flop in response to said status reading, a counter which starts counting in response to the setting of said third flip-flop, a register into which a predetermined delay value is loaded, and a comparator which compares the contents of said counter and said register and, when they are equal to each other, sets said first flip-flop and resets second flip-flop and said third flip-flop.

18. The method of claim 17, wherein said delay value is set so that said interrupt request can be generated when said host is ready to respond.

19. A peripheral device that generates a data request to send an interrupt request to a host when a block of data is ready to be transferred, and the host responds to said interrupt request and operates in one of a first mode to start a block data transfer after reading status of said peripheral device or in a second mode to read said status after completing said block data transfer, an interface circuit for controlling data transfers, said peripheral device comprising:

interrupt means for generating said interrupt request in response to said data request and dropping said interrupt request in response to said status reading;

mode detecting means for detecting that said host operates in said second mode to read said status after completing said block data transfer; and interrupt enable means responsive to a second mode detect signal from said mode detecting means and said status reading to enable said interrupt means to regenerate said interrupt request.

20. The peripheral device of claim 19, wherein said data request is dropped at the completion of reading said block of data and regenerated when the next block of data is ready to be transferred.

21. The peripheral device circuit of claim 20, wherein said interrupt means includes a first flip-flop which is set in response to the generation of said data request and the output of said flip-flop becomes said interrupt request.

22. The peripheral device of claim 21, wherein said mode detecting means includes a second flip-flop which is set to the same condition as said first flip-flop in response to said data request.

23. The peripheral device of claim 22, wherein said interrupt enable means includes a third flip-flop which is set to the same condition as said second flip-flop in response to said status reading, a counter which starts counting in response to the setting of said third flip-flop, a register into which a predetermined delay value is loaded, and a comparator which compares the contents of said counter and said register and, when they are equal to each other, sets said first flip-flop and resets said second flip-flop and said third flip-flop.

24. The peripheral device of claim 23, wherein said delay value is set so that said interrupt request can be generated when said host is ready to respond.

* * * * *